(12) United States Patent
Smith (10) Patent No.: US 11,081,873 B2
(45) Date of Patent: Aug. 3, 2021

(54) DIRECT CURRENT MOTOR CONTROLLER

(71) Applicant: Stan Smith, Tallahassee, FL (US)

(72) Inventor: Stan Smith, Tallahassee, FL (US)

(*) Notice: Subject to any disclaimer, the term of this patent is extended or adjusted under 35 U.S.C. 154(b) by 360 days.

(21) Appl. No.: 16/118,199

(22) Filed: Aug. 30, 2018

(65) Prior Publication Data
US 2019/0067934 A1 Feb. 28, 2019

Related U.S. Application Data

(60) Provisional application No. 62/551,896, filed on Aug. 30, 2017.

(51) Int. Cl.
*H02H 7/08* (2006.01)
*H02P 7/03* (2016.01)
*H02P 1/18* (2006.01)

(52) U.S. Cl.
CPC ............. *H02H 7/0833* (2013.01); *H02P 1/18* (2013.01); *H02P 7/05* (2016.02)

(58) Field of Classification Search
CPC ............ H02H 7/0833; H02P 7/05; H02P 1/18
See application file for complete search history.

(56) References Cited

U.S. PATENT DOCUMENTS

2005/0242244 A1* 11/2005 Ridgeway ................. B61L 5/06
246/221
2016/0301323 A1* 10/2016 Dilley .................... H02M 7/003

* cited by examiner

*Primary Examiner* — Zoheb S Imtiaz (57) ABSTRACT

A direct current motor controller includes a housing, a plurality of terminals, a first two-way switch, a second two-way switch, an actuating mechanism, and a remote controller plug. The terminals and remote controller plug traverse out of the housing as the first two-way switch, the second two-way switch, and the actuating mechanism are mounted within the housing. A first output terminal, a first power supply positive terminal, and a third power supply negative terminals from the terminals are electrically connected to the first two-way switch. A second output terminal, a second power supply positive terminal, and the third power supply negative terminal from the terminals are electrically connected to the second two-way switch. The remote controller plug is electrically connected to the second power supply positive terminal. The actuating mechanism operatively couples with the first and second two-way switches to toggle and inversely toggle the first and second two-way switches.

11 Claims, 8 Drawing Sheets

DIRECT CURRENT MOTOR CONTROLLER

The current application claims a priority to the U.S. Provisional Patent application Ser. No. 62/551,896 filed on Aug. 30, 2017.

FIELD OF THE INVENTION

The present invention relates generally to a controller box of a motor. More specifically, the present invention is a direct current motor controller that is capable of operating a motor in counter clockwise direction even after automatic power is cut-off by a protective circuit breaker.

BACKGROUND OF THE INVENTION

A standard winch solenoid/relay is a device primarily used for controlling clockwise rotation and counter clockwise rotation of the winch. When the winch is overloaded during actual use, the protective circuit breaker on the winch automatically cuts off power, thus making the winch unable to rotate. Resultantly, a standard winch solenoid/relay has the following technical problems: when the protective circuit breaker on the winch automatically cuts off power, the winch is unable to rotate and this in turn results in the cable being constantly strained. Overstretching of the cable also poses some safety risks. Furthermore, the relays currently available in the market often need to be provided with an assembly box made of plastic or iron, and their installation on the winch also requires a base plate and cannon head line for them to function as a relay, and this results in poor external appearance; all relays currently available in the market are large in size and occupy larger space, making it impossible for them to be installed on many vehicles and bumpers, hence their application scenarios are limited and their costs are too high.

It is therefore an objective of the present invention to provide a direct current motor controller that aims to provide a winch solenoid/relay capable of controlling the winch to rotate clockwise and counter clockwise even after automatic power is cut-off by the protective circuit breaker. As a result, the present invention achieves cable slackening after automatic power cut-off by the protective circuit breaker to improve safety. Even though the present invention explains in regard to a winch system, the present invention can be used within any other system that requires a direct current motor controller.

DETAIL DESCRIPTIONS OF THE INVENTION

All illustrations of the drawings are for the purpose of describing selected versions of the present invention and are not intended to limit the scope of the present invention.

Figure 4:
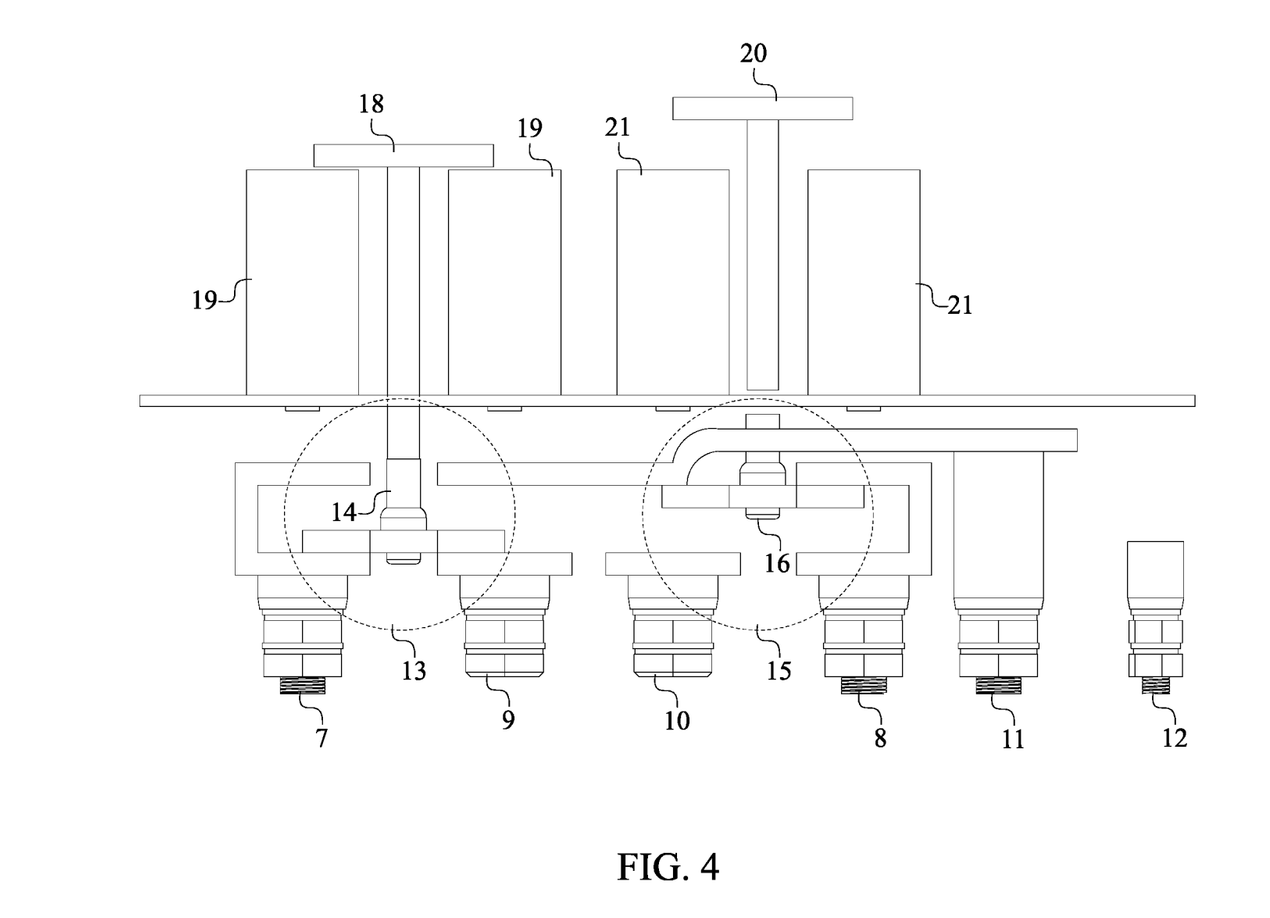
FIG. 4 is a schematic view of the present invention, wherein the first push rod and the first coil group are in the energized state and the second push rod and the second coil group are in the de-energized state.
Figure 5:
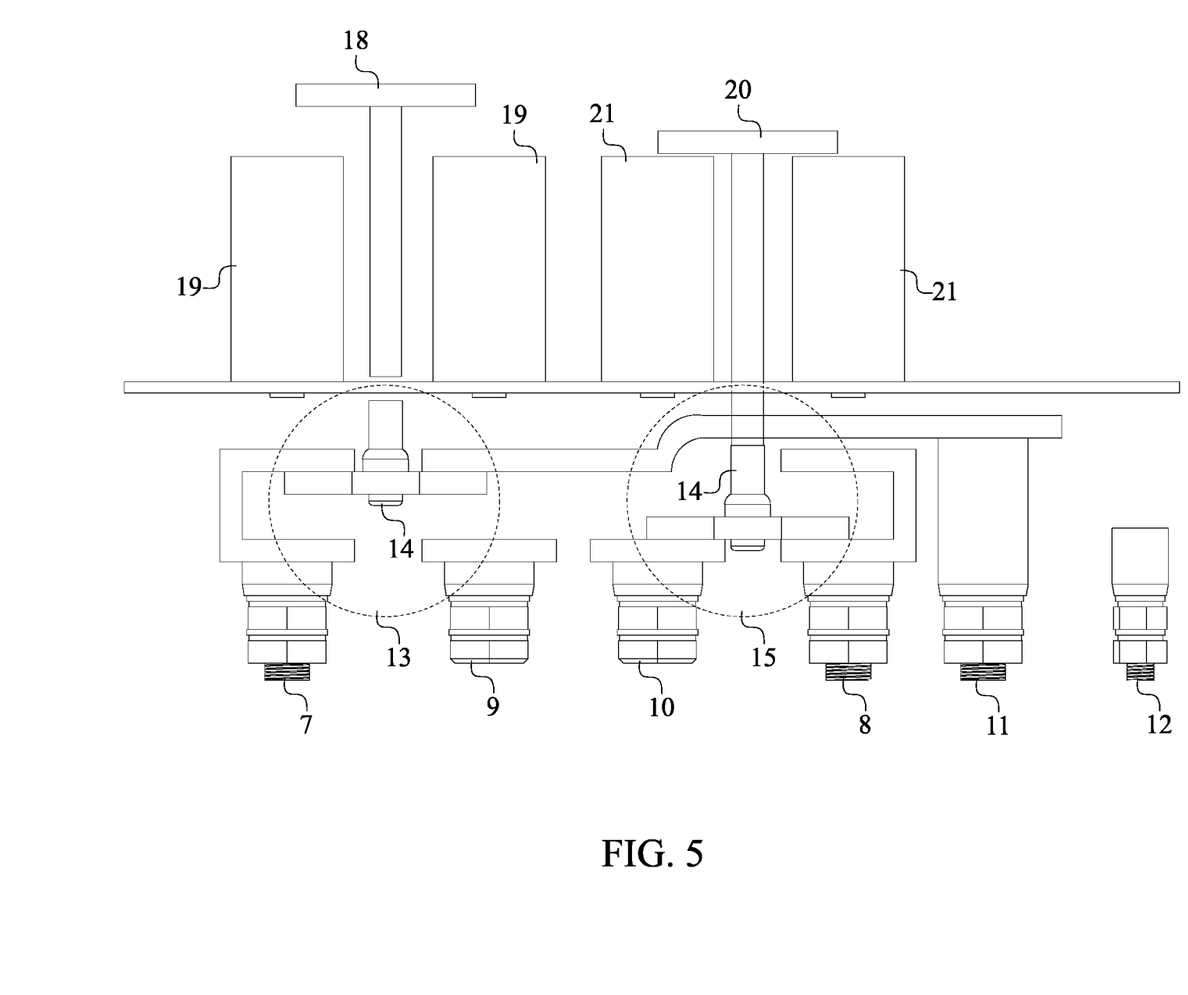
FIG. 5 is a schematic view of the present invention, wherein the first push rod and the first coil group are in the de-energized state and the second push rod and the second coil group are in the energized state.

The present invention is a direct current motor controller that rotates the motor counter clockwise and clockwise upon user input. Generally, when the electric current is overloaded within the motor or the motor is overheated within existing motor controllers, the electric current to the motor is automatically cut-off by a protective circuit breaker thus completely stalling the system. The present invention is able to overcome this limitation by providing a secondary source of power to the motor that enables the motor to rotate counter clockwise even after automatic power cut-off by the protective circuit breaker. As an example, when the present invention is utilized to control a winch system, the present invention can achieve cable slackening through the counter clockwise rotation after automatic power cut-off by the protective circuit breaker to improve safety. The present invention comprises a housing 1, a plurality of terminals 6, a first two-way switch 13, a second two-way switch 15, an actuating mechanism 17, and a remote controller plug 23 as shown in FIG. 1 and FIG. 4-5.

In reference to the general configuration of the present invention, each of the plurality of terminals 6 that enables the electrical wires to be connected in between the motor and a battery is traverses out of the housing 1. The remote controller plug 23 that enables electrical connection between the present invention and an external remote-control device traverses out of the housing 1. The first two-way switch 13, the second two-way switch 15, the actuating mechanism 17 that collectively control the clockwise and counter clockwise rotation of the motor are mounted within the housing 1. The electric current for the first two-way switch 13 and the second two-way switch 15 is provided through the plurality of terminals 6 as the plurality of terminals 6 comprises a first output terminal 7, a second output terminal 8, a first power supply positive terminal 9, a second power supply positive terminal 10, a third power supply negative terminal 11, and a ground terminal 12. More specifically, the first output terminal 7, the first power supply positive terminal 9, and the third power supply negative terminal 11 are electrically connected to the first two-way switch 13 so that the motor can be powered through the first two-way switch 13. The second output terminal 8, the second power supply positive terminal 10, and the third power supply negative terminal 11 are electrically connected to the second two-way switch 15 through the second two-way switch 15. The remote controller plug 23 is electrically connected to the second power supply positive terminal 10 through the actuating mechanism 17 so that the external remote-control device can be powered through the second power supply positive terminal 10 and operates the actuating mechanism 17. The actuating mechanism 17 is operatively coupled with the first two-way switch 13 and the second two-way switch 15, wherein the actuating mechanism 17 is used to toggle the first two-way switch 13 and is used to inversely toggle the second two-way switch 15 thus controlling the clockwise rotation and the counter clockwise rotation of the motor.

Figure 1:
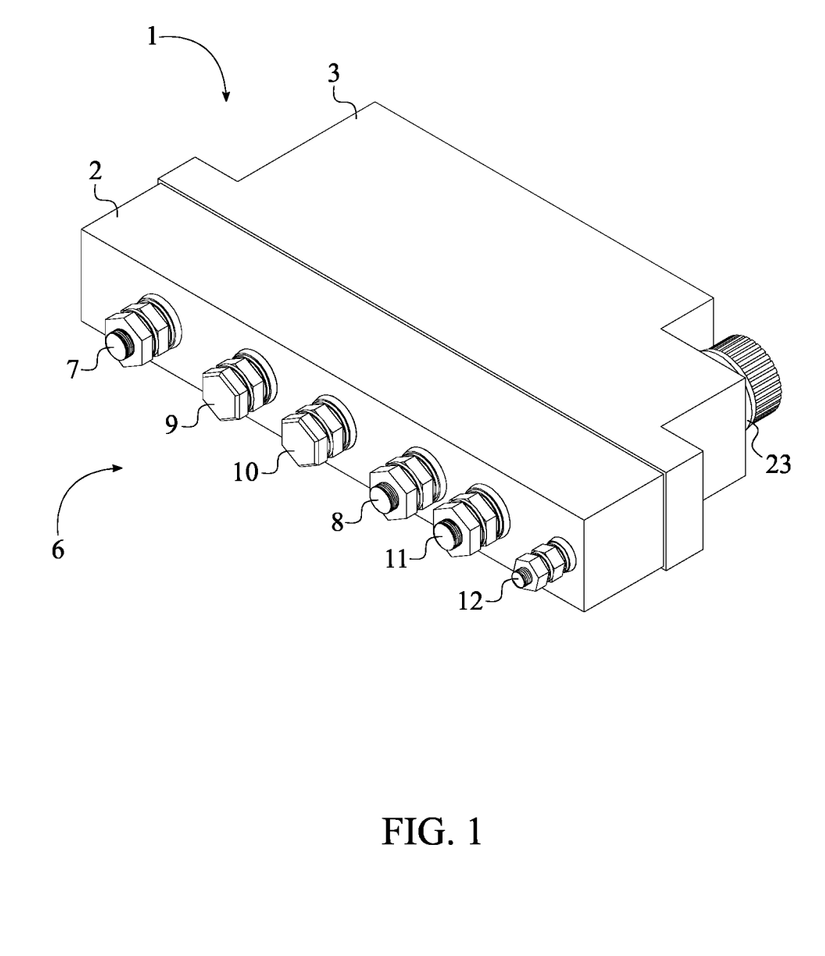
FIG. 1 is a top perspective view of the present invention, showing the front side of the present invention.
Figure 2:
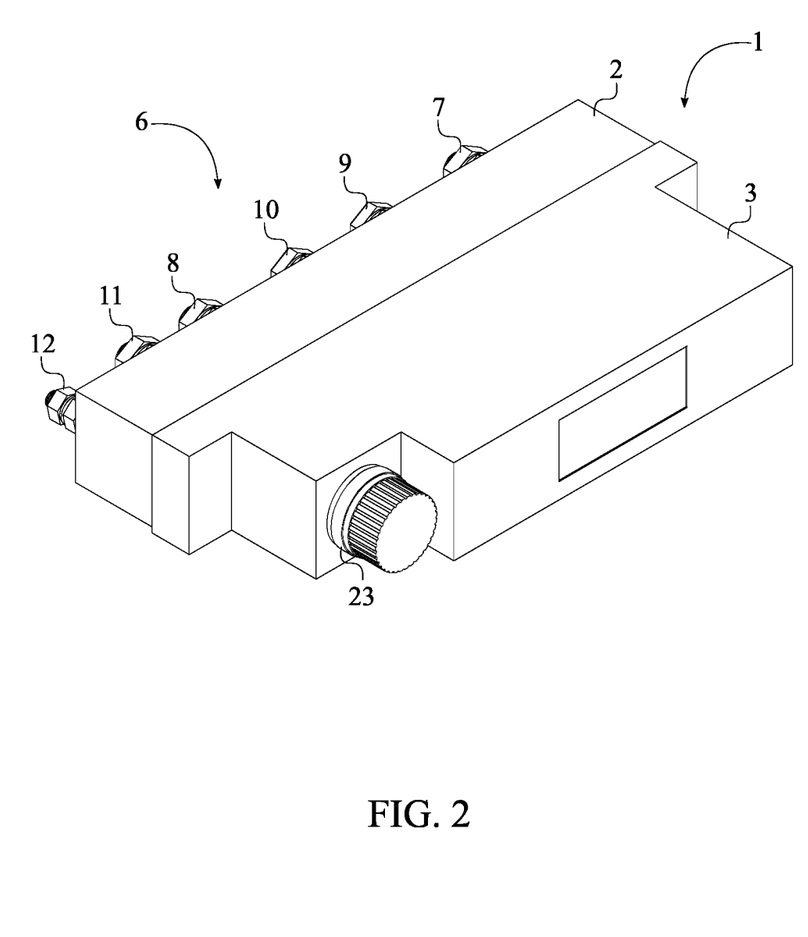
FIG. 2 is a top perspective view of the present invention, showing the rear side of the present invention
Figure 3:
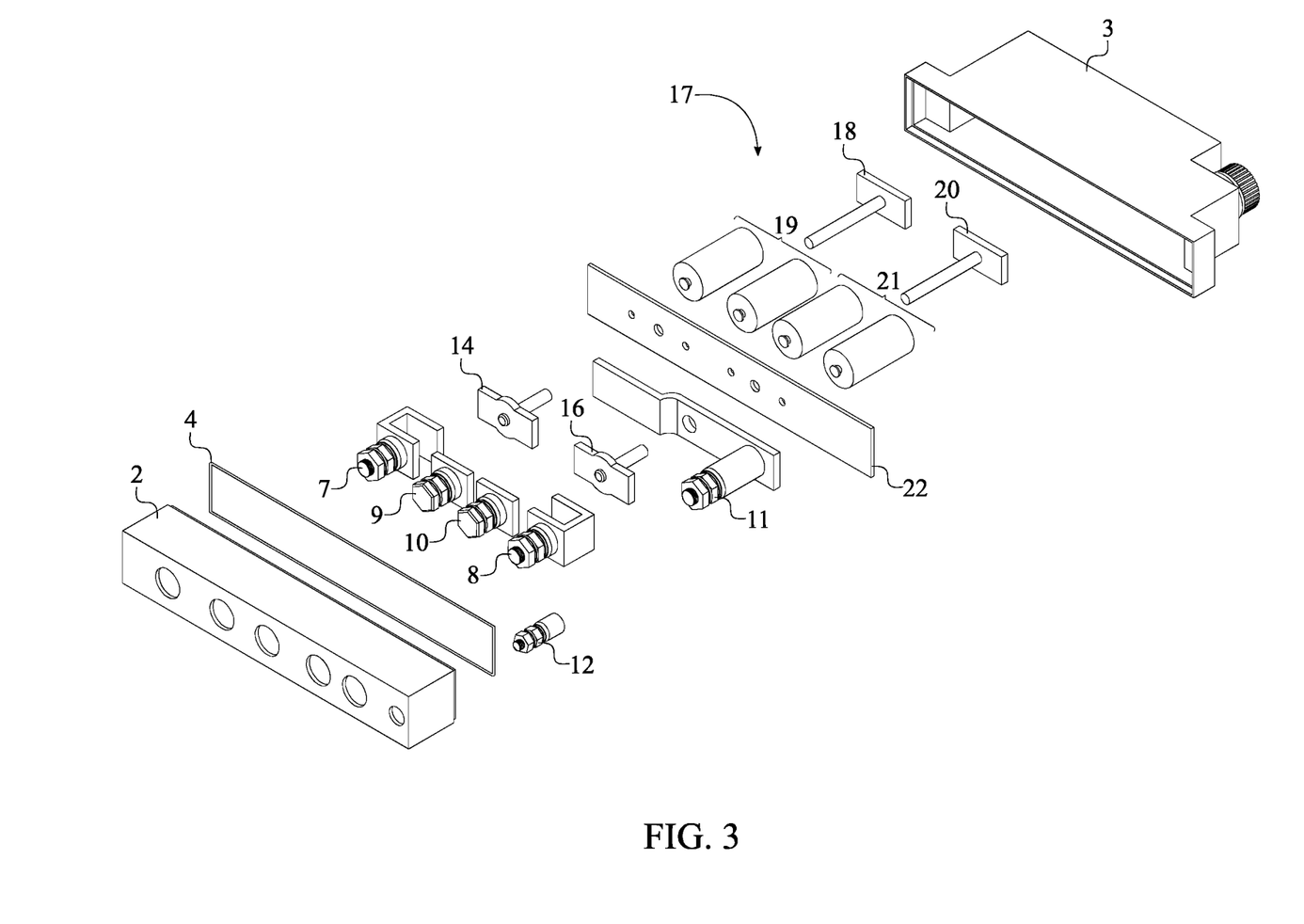
FIG. 3 is an exploded view of the present invention, showing the inner components of the present invention.

In reference to FIG. 1-3, the housing 1 that encloses the internal components of the present invention and provides surface area to integrate external component of the present invention comprises a front shell 2, a rear shell 3, a sealing ring 4, a plurality of fasteners, and a mounting plate 22. More specifically, the front shell 2 and the rear shell 3 are configured as a hollow chamber structures and capable of interlocking into one another to form a cube-like shape. The sealing ring 4 is perimetrically positioned around the front shell 2 and positioned opposite of the plurality of terminals 6. The front shell 2 is hermetically attached into the rear shell 3 so that the connection between the front shell 2 and the rear shell 3 is able to form an airtight connection through the sealing ring 4. In other words, the sealing ring 4 is capable of improving the waterproofing, antipollution, and anticorrosive properties internal components of the present invention. The plurality of fasteners, preferably a plurality of fastener screws, attaches the front shell 2 to the rear shell 3 as the internal components are housed within the front shell 2 and the rear shell 3. Furthermore, the mounting plate 22 is connected within the rear shell 3 and in between the plurality of terminals 6 and the actuating mechanism 17. The mounting plate 22 enables the actuating mechanism 17 to be connected within the rear shell 3 thus securing the actuating mechanism 17 within the rear shell 3. The mounting piece is preferably an iron plate; however, the mounting plate 22 can be made of any other types of rigid metal or non-metal material.

In reference to FIG. 2, the remote controller plug 23 traverses out of the rear shell 3 so that the remote controller plug 23 can be positioned away from the plurality of terminals 6. The first output terminal 7, the second output terminal 8, the first power supply positive terminal 9, the second power supply positive terminal 10, the third power supply negative terminal 11, and the ground terminal 12 traverse out of the front shell 2. As a result of the opposite positioning of the remote controller plug 23 and the plurality of terminals 6, the housing 1 is able to provide sufficient and obstruction-free surface area to receive the electrical wires for the plurality of terminals 6 and the external remote-control device for the remote controller plug 23.

In reference to FIG. 1 and FIG. 4-5, the preferred embodiment of the present invention, the first power supply positive terminal 9 and the second power supply positive terminal 10 are disposed at the center of the first output terminal 7 and the second output terminal 8. The first power supply positive terminal 9 and the first output terminal 7 are positioned adjacent with each other while the second power supply positive terminal 10 and the second output terminal 8 are positioned adjacent with each other. More specifically, the first output terminal 7 and the second output terminal 8 are structurally identical, and each of which comprises an n-shaped contactor plate and a pole connector disposed on the connector plate. The first power supply positive terminal 9 and the second power supply positive terminal 10 are structurally identical, and each of which comprises a flat contactor plate and a pole connector disposed on the connector plate. Furthermore, the n-shaped contactor plate of the first output terminal 7 and the flat contactor plate of the first power supply positive terminal 9 respectively function as a first terminal and a second terminal of the first two-way switch 13. The n-shaped contactor plate of the second output terminal 8 and the flat contactor plate of the second power supply positive terminal 10 respectively function as a first terminal and a second terminal of the second two-way switch 15. The third power supply negative terminal 11 comprises an elongated contactor plate that is extended from the first two-way switch 13 to the second two-way switch 15. As a result, the elongated contactor plate functions as a third terminal for the first two-way switch 13 to the second two-way switch 15. The ground terminal 12 provides a ground loop for the present invention as the ground terminal 12 electrically connects with the remote controller plug 23, the actuating mechanism 17, and allows a negative battery terminal to be electrically connected if necessary.

In reference to FIG. 3, the actuating mechanism 17 comprises a first push rod 18, a first coil group 19, a second push rod 20, and a second coil group 21. More specifically, the first push rod 18 is concentrically positioned within the first coil group 19 and oriented towards the first two-way switch 13. The second push rod 20 is concentrically positioned within the second coil group 21 and oriented towards the second two-way switch 15. The first coil group 19 and the second coil group 21 are electrically connected to second power supply positive terminal 10 and the ground terminal 12 so that first coil group 19 or the second coil group 21 can be powered through the operation of the external remote-control device to generate a magnetic field. The first coil group 19 and the second coil group 21 each comprises at least two coils for generating a magnetic field in a simultaneous state as the field of intensity can be at least doubled within the present invention.

Figure 6:
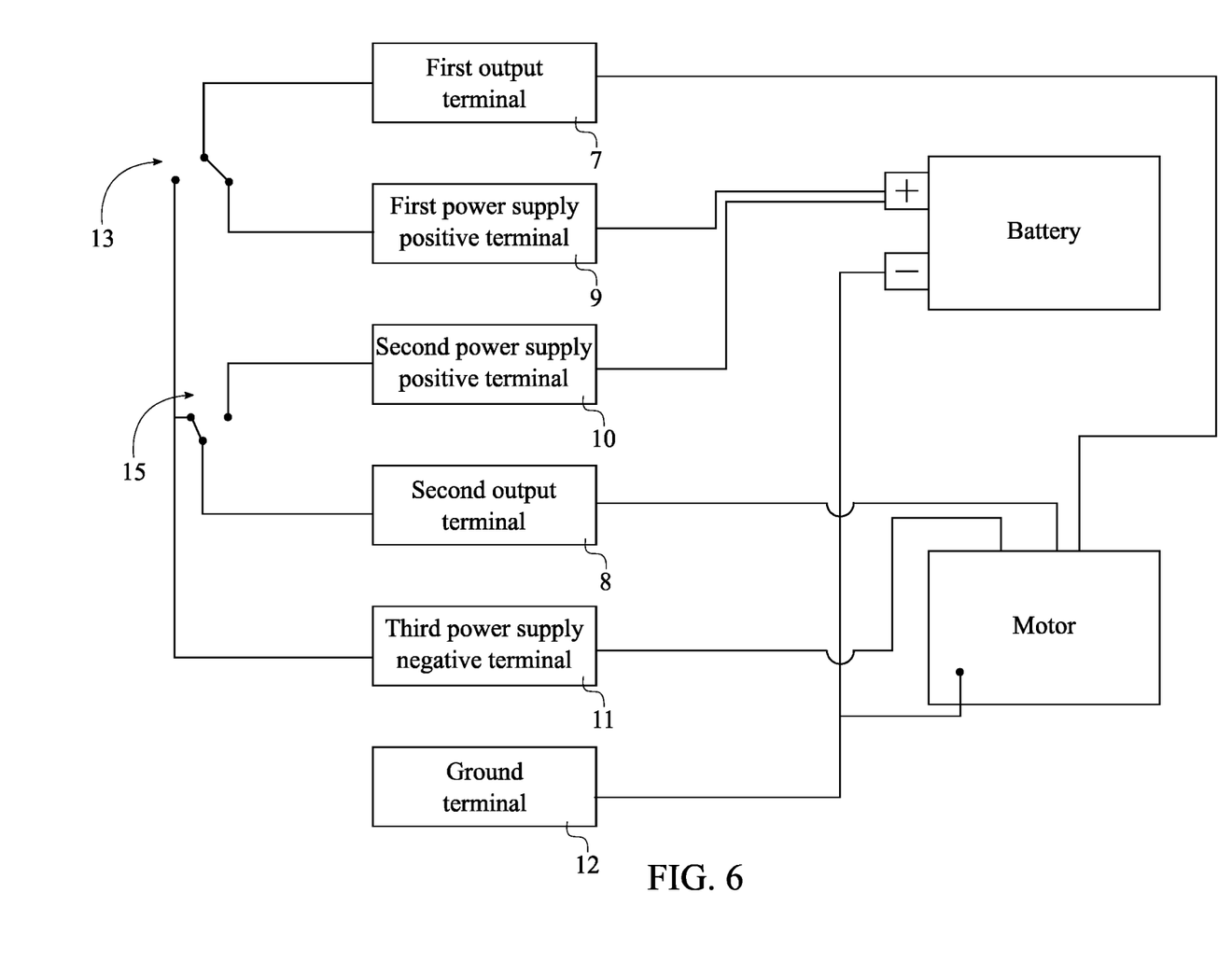
FIG. 6 is a schematic view illustrating the electrical connection of the present invention with a battery and a motor, wherein the first push rod and the first coil group are in the energized state and the second push rod and the second coil group are in the de-energized state, and the motor is in clockwise rotation.

In reference to FIG. 4 and FIG. 6, once the external remote-control device actuates the clockwise rotation of the motor, the first coil group 19 is electrically connected to the second power supply positive terminal 10 and the ground terminal 12 through the remote controller plug 23. The first push rod 18 is then magnetically actuated into a first contactor bridge 14 of the first two-way switch 13. Due to the configuration of the first coil group 19 and the first push rod 18, an energized state of the magnetic field for the first coil group 19 facilitates movement of the first push rod 18 into the first contactor bridge 14. However, the second push rod 20 is offset from the second two-way switch 15 as the magnetic field for the second coil group 21 is at a de-energized state due to an open circuit.

Figure 7:
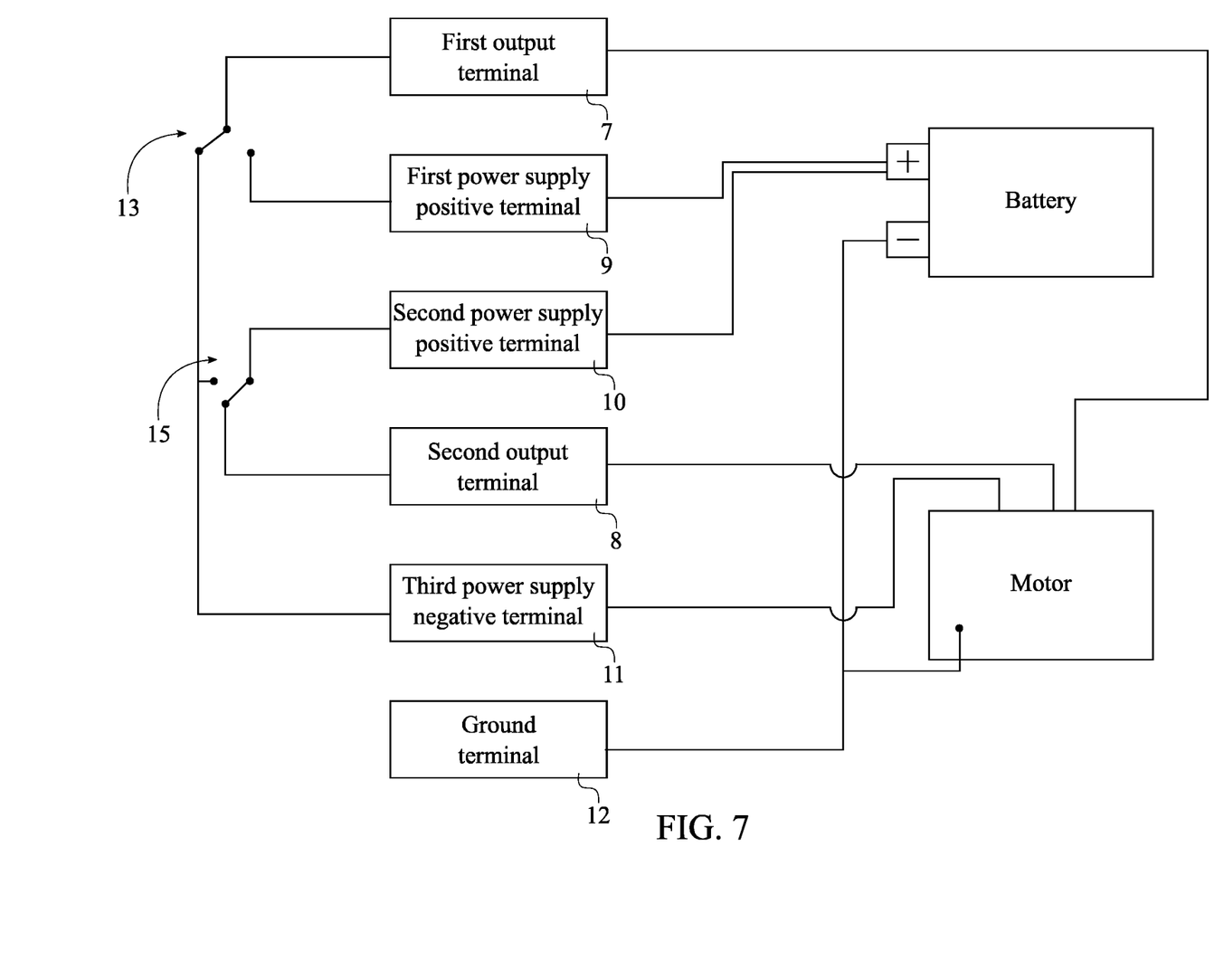
FIG. 7 is a schematic view illustrating the electrical connection of the present invention with a battery and a motor, wherein the first push rod and the first coil group are in the de-energized state and the second push rod and the second coil group are in the energized state, and the motor is in counter clockwise rotation.

In reference to FIG. 5 and FIG. 7, once the external remote-control device actuates the counter clockwise rotation of the motor, the second coil group 21 is electrically connected to the second power supply positive terminal 10 and the ground terminal 12 through the remote controller plug 23. The second push rod 20 is then magnetically actuated into a second contactor bridge 16 of the second two-way switch 15. Due to the configuration of the second coil group 21 and the second push rod 20, an energized state of the magnetic field for the second coil group 21 facilitates movement of the second push rod 20 into the second contactor bridge 16. However, the first push rod 18 is offset from the first two-way switch 13 as the magnetic field for the first coil group 19 is at a de-energized state due to an open circuit.

The first contactor bridge 14 and the second contactor bridge 16 are components capable of performing movement and switching between the power supply from either the first power supply positive terminal 9 to the third power supply negative terminal 11 or the second power supply positive terminal 10 to the third power supply negative terminal 11, under the action of the actuating mechanism 17. During the process of switching the power supply, the first contactor bridge 14 is always electrically connected with the first output terminal 7, and the second contactor bridge 16 is always electrically connected to the second output terminal 8. The first contactor bridge 14 and the second contactor bridge 16 are identically T-shaped bodies are made from conductive material to enable their electrical connections during their movements.

In reference to FIG. 4 and FIG. 6, when the first push rod 18 is engaged with the first contactor bridge 14 and the second push rod 20 is positioned offset from the second two-way switch 15, the motor is considered to be in the clockwise rotational direction. Once the first push rod 18 pushes the first contactor bridge 14, the first contactor bridge 14 is tensionably pressed against the first terminal and the second terminal of the first two-way switch 13, that are the first output terminal 7 and the first power supply positive terminal 9. As a result, the first output terminal 7 and the first power supply positive terminal 9 are electrically connected to each other through the first contactor bridge 14. Since the second push rod 20 is positioned offset from the second two-way switch 15 and the second contactor bridge 16, the second contactor bridge 16 is tensionably pressed against the first terminal and the third terminal of the second two-way switch 15, that are the second output terminal 8 and the third power supply negative terminal 11. As a result, the second output terminal 8 and the third power supply negative terminal 11 are electrically connected to each other through the second contactor bridge 16.

In reference to FIG. 5 and FIG. 7, when the second push rod 20 is engaged with the second contactor bridge 16 and the first push rod 18 is positioned offset from the first two-way switch 13, the motor is considered to be in the counter clockwise rotational direction. Once the second push rod 20 pushes the second contactor bridge 16, the second contactor bridge 16 is tensionably pressed against the first terminal and the second terminal of the second two-way switch 15, that are the second output terminal 8 and the second power supply positive terminal 10. As a result, the second output terminal 8 and the second power supply positive terminal 10 are electrically connected to each other through the second contactor bridge 16. Since the first push rod 18 is positioned offset from the first two-way switch 13 and the first contactor bridge 14, the first contactor bridge 14 is tensionably pressed against the first terminal and the third terminal of the first two-way switch 13, that are the first output terminal 7 and the third power supply negative terminal 11. As a result, the second output terminal 8 and the third power supply negative terminal 11 are electrically connected to each other through the second contactor bridge 16.

When the protective circuit breaker is utilized with the present invention, the protective circuit breaker is electrically connected in between the first power supply positive terminal 9 and a positive battery terminal. As a result, the present invention is still able to power the motor when the protective circuit breaker is tripped. For example, when a clockwise rotation of a motor trips the protective circuit breaker, the motor is not able to continue the clockwise rotation. However, the motor does not completely loss power and stall as the motor is able to rotate counter clockwise through the second power supply positive terminal 10. As a result, the motor is able to release a cable slackening of a winch system through the counter clockwise rotation after automatic power cut-off by the protective circuit breaker to improve safety.

Figure 8:
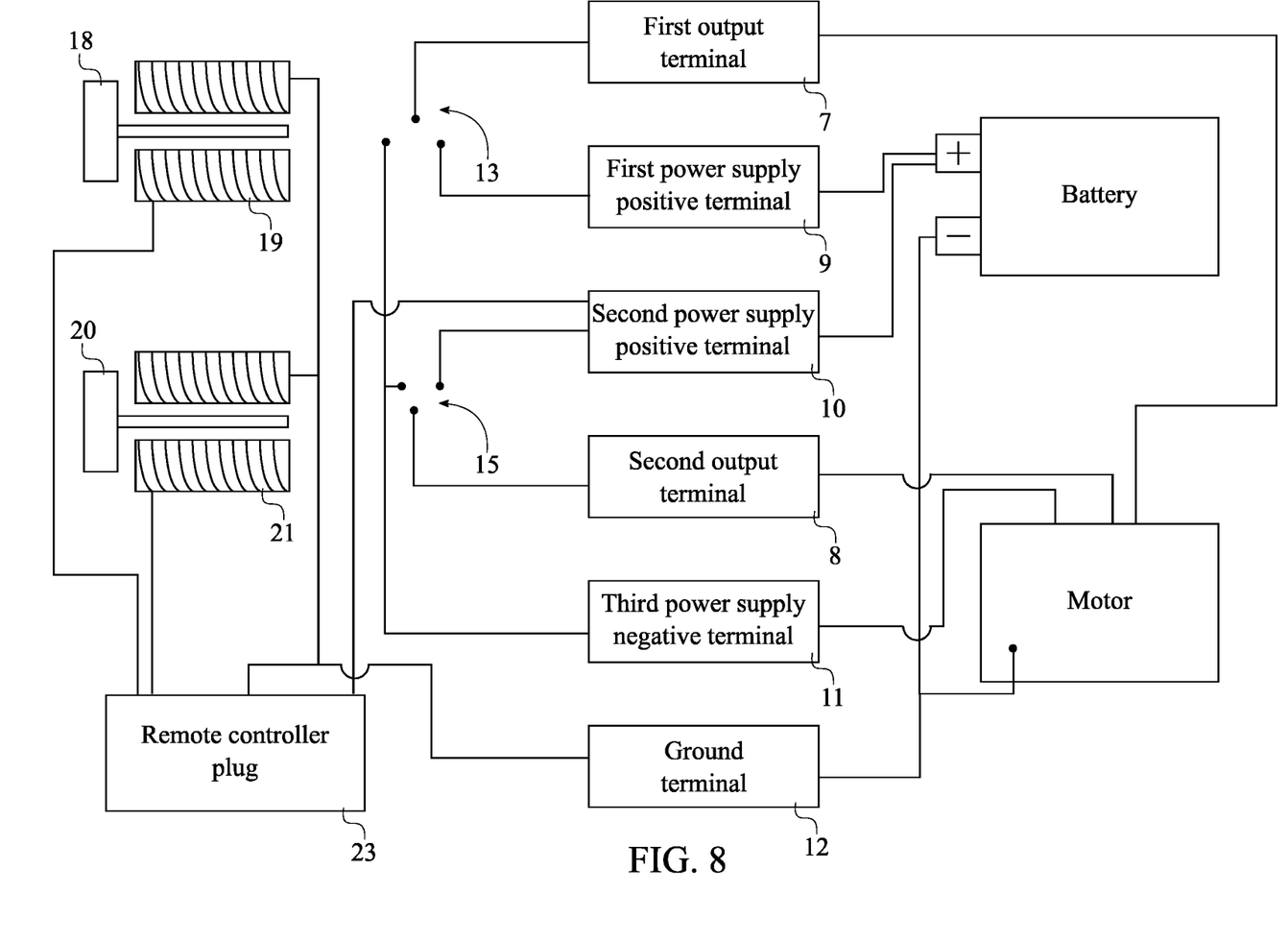
FIG. 8 is a schematic view illustrating the electrical connection of the present invention with a battery and a motor, in relation to the remote controller plug.

In reference to FIG. 8, the remote controller plug 23 comprises a first pin, a second pin, a third pin, and a fourth pin. More specifically, the first pin is electrically connected with the second coil group 21 to initiate the counter clockwise rotation of the motor through the external remote-control device. The second pin is electrically connected with the first coil group 19 to initiate the clockwise rotation of the motor through the external remote-control device. The third pin is electrically connected to the second power supply positive terminal 10 to power the external remote-control device. The fourth pin is electrically connected to the ground terminal 12 so that fourth pin is able to receive a group loop from the first coil group 19, the second coil group 21, and the external remote-control device. The first pin, the second pin, the third pin, and the fourth pin correspond with matching female opening of a terminal end of the external remote-control device so that the external remote-control device can be easily attached to the remote controller plug 23.

Although the invention has been explained in relation to its preferred embodiment, it is to be understood that many other possible modifications and variations can be made without departing from the spirit and scope of the invention as hereinafter claimed.

What is claimed is:
1. A direct current motor controller comprises:
a housing;
a plurality of terminals;
a first two-way switch;
a second two-way switch;
an actuating mechanism;
a remote controller plug;
each of the plurality of terminals and the remote controller plug traversing out of the housing;
the first two-way switch, the second two-way switch, and the actuating mechanism being mounted within the housing;
the plurality of terminals comprises a first output terminal, a second output terminal, a first power supply positive terminal, a second power supply positive terminal, and a third power supply negative terminal;
the first output terminal, the first power supply positive terminal, and the third power supply negative terminal being electrically connected to the first two-way switch;
the second output terminal, the second power supply positive terminal, and the third power supply negative terminal being electrically connected to the second two-way switch;
the remote controller plug being electrically connected to the second power supply positive terminal through the actuating mechanism;
the actuating mechanism being operatively coupled with the first two-way switch and the second two-way switch, wherein the actuating mechanism is used to toggle the first two-way switch and is used to inversely toggle the second two-way switch;
the actuating mechanism comprises a first push rod, a first coil group, a second push rod, and a second coil group;
the plurality of terminals further comprises a ground terminal;
the first push rod being concentrically positioned within the first coil group;
the first push rod being oriented towards the first two-way switch;
the second push rod being concentrically positioned within the second coil group; and the second push rod being oriented towards the second two-way switch.

2. The direct current motor controller as claimed in claim 1 comprises:
the housing further comprises a front shell, a rear shell, and a sealing ring;
the sealing ring being perimetrically positioned around the front shell, opposite of the plurality of terminals; and
the front shell being hermetically attached into the rear shell.

3. The direct current motor controller as claimed in claim 1 comprises:
the housing further comprises a rear shell and a mounting plate;
the mounting plate being connected within the rear shell; and
the actuating mechanism being connected to the mounting plate.

4. The direct current motor controller as claimed in claim 1 comprises:
the housing further comprises a rear shell; and
the remote controller plug traversing out of the rear shell.

5. The direct current motor controller as claimed in claim 1 comprises:
the housing further comprises a front shell; and
the first output terminal, the second output terminal, the first power supply positive terminal, the second power supply positive terminal, and the third power supply negative terminal traversing out of the front shell.

6. The direct current motor controller as claimed in claim 1 comprises:
the first coil group being electrically connected to the second power supply positive terminal and the ground terminal through the remote controller plug;
the first push rod being magnetically actuated into a first contactor bridge of the first two-way switch, wherein the magnetic field in an energized state of the first coil group is used to facilitate movement of the first push rod; and
the second push rod being offset from the second two-way switch, wherein the magnetic field in a de-energized state of the second coil group.

7. The direct current motor controller as claimed in claim 1 comprises:
the second coil group being electrically connected to the second power supply positive terminal and the ground terminal through the remote controller plug;
the second push rod being magnetically actuated into a second contactor bridge the second two-way switch, wherein the magnetic field in an energized state of the second coil group is used to facilitate movement of the second push rod; and
the first push rod being offset from the first two-way switch, wherein the magnetic field in a de-energized state of the first coil group.

8. The direct current motor controller as claimed in claim 1 comprises:
the actuating mechanism comprises a first push rod and a second push rod;
the first two-way switch comprises a first contactor bridge;
the second two-way switch comprises a second contactor bridge;
the first push rod being engaged with the first contactor bridge;
the second push rod being positioned offset from the second two-way switch;
the first output terminal and the first power supply positive terminal being electrically connected to each other through the first contactor bridge; and
the second output terminal and the third power supply negative terminal being electrically connected to each other through the second contactor bridge.

9. The direct current motor controller as claimed in claim 8 comprises:
the first contactor bridge being tensionably pressed against the first output terminal and the first power supply positive terminal by the first push rod; and
the second contactor bridge being tensionably pressed against the second output terminal and the third power supply negative terminal.

10. The direct current motor controller as claimed in claim 1 comprises:
the actuating mechanism comprises a first push rod and a second push rod;
the first two-way switch comprises a first contactor bridge;
the second two-way switch comprises a second contactor bridge;
the first push rod being positioned offset from the first two-way switch;
the second push rod being engaged with the second contactor bridge;
the first output terminal and the third power supply negative terminal being electrically connected to each other through the first contactor bridge; and
the second output terminal and the second power supply positive terminal being electrically connected to each other through the second contactor bridge.

11. The direct current motor controller as claimed in claim 10 comprises:
the second contactor bridge being tensionably pressed against the second output terminal and the second power supply positive terminal by the second push rod; and
the first contactor bridge being tensionably pressed against the first output terminal and the third power supply negative terminal.

\* \* \* \* \*